United States Patent
Sawada et al.

(10) Patent No.: US 10,647,901 B2
(45) Date of Patent: *May 12, 2020

(54) REFRIGERATING MACHINE OIL COMPOSITION AND WORKING FLUID COMPOSITION FOR REFRIGERATING MACHINE USING SAME

(71) Applicant: KH NEOCHEM CO., LTD., Tokyo (JP)

(72) Inventors: Takahiro Sawada, Yokkaichi (JP); Junya Kishi, Yokkaichi (JP); Aya Okita, Yokkaichi (JP)

(73) Assignee: KH NEOCHEM CO., LTD., Tokyo (JP)

( * ) Notice: Subject to any disclaimer, the term of this patent is extended or adjusted under 35 U.S.C. 154(b) by 16 days.

This patent is subject to a terminal disclaimer.

(21) Appl. No.: 15/764,741

(22) PCT Filed: Sep. 29, 2016

(86) PCT No.: PCT/JP2016/078888
§ 371 (c)(1),
(2) Date: Mar. 29, 2018

(87) PCT Pub. No.: WO2017/057614
PCT Pub. Date: Apr. 6, 2017

(65) Prior Publication Data
US 2018/0273817 A1  Sep. 27, 2018

(30) Foreign Application Priority Data
Sep. 29, 2015 (JP) .................. 2015-191943

(51) Int. Cl.
| | | |
|---|---|---|
| C09K 5/04 | (2006.01) | |
| C10M 173/02 | (2006.01) | |
| C10M 113/02 | (2006.01) | |
| C10M 169/04 | (2006.01) | |
| F25B 1/00 | (2006.01) | |
| C10M 171/00 | (2006.01) | |

(52) U.S. Cl.
CPC .......... *C09K 5/045* (2013.01); *C10M 113/02* (2013.01); *C10M 169/04* (2013.01); *C10M 171/008* (2013.01); *C10M 173/02* (2013.01); *F25B 1/00* (2013.01); *C09K 2205/122* (2013.01); *C09K 2205/126* (2013.01); *C09K 2205/22* (2013.01); *C10M 2201/02* (2013.01); *C10M 2201/041* (2013.01); *C10M 2207/2835* (2013.01); *C10M 2209/084* (2013.01); *C10M 2209/0845* (2013.01); *C10N 2220/302* (2013.01); *C10N 2230/02* (2013.01); *C10N 2230/06* (2013.01); *C10N 2230/10* (2013.01); *C10N 2230/70* (2013.01); *C10N 2240/30* (2013.01); *C10N 2250/141* (2013.01)

(58) Field of Classification Search
CPC ............... C09K 5/045; C09K 2205/24; C10M 2223/041; C10M 2217/0245; C10M 2209/043; C10M 2207/2835; C10M 2207/282; C10M 2207/042; C10M 2207/026; C10M 2205/0206; C10M 111/04; C10M 171/008; C10M 107/32; C10M 107/28; C10M 169/04; C10M 105/38; C10N 2240/30; C10N 2230/10; C10N 2230/06; C10N 2220/302; C10N 2220/022; C10N 2220/021; F25B 2500/16
USPC .................................. 252/68; 508/459, 485
See application file for complete search history.

(56) References Cited

U.S. PATENT DOCUMENTS

| | | |
|---|---|---|
| 5,017,300 A | 5/1991 | Raynolds |
| 2003/0166478 A1* | 9/2003 | Shimomura ......... C10M 105/42 508/304 |
| 2006/0243944 A1 | 11/2006 | Minor et al. |
| 2006/0243945 A1 | 11/2006 | Minor et al. |

(Continued)

FOREIGN PATENT DOCUMENTS

| | | |
|---|---|---|
| JP | H04275397 A | 9/1992 |
| JP | 3051673 B2 | 6/2000 |

(Continued)

*Primary Examiner* — Douglas J McGinty
(74) *Attorney, Agent, or Firm* — Marshall, Gerstein & Borun LLP; Michael Muczynski

(57) ABSTRACT

Provided is a refrigerating machine oil composition for a mixed refrigerant comprising difluoromethane, the composition comprising a polymer (A) below and an ester (B) of polyhydric alcohol(s) with aliphatic monocarboxylic acid(s).

The polymer (A): a polymer which is obtained by polymerizing monomer(s) consisting of at least one monomer of monosubstituted ethylenes and disubstituted ethylenes, and in which a ratio of a monomer represented by the following general formula (I):

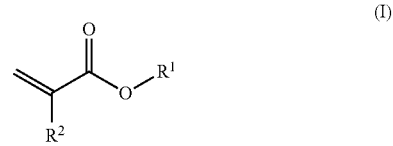

(I)

wherein $R^1$ represents an alkyl group having 1 to 14 carbon atoms, $R^2$ represents hydrogen or an alkyl group having 1 to 4 carbon atoms, and the sum of carbon numbers in $R^1$ and $R^2$ is 2 to 14, is 75 to 100% by mass based on a total mass of monomers constituting the polymer.

11 Claims, No Drawings

(56) References Cited

U.S. PATENT DOCUMENTS

| | | |
|---|---|---|
| 2007/0108403 A1 | 5/2007 | Sievert et al. |
| 2007/0257229 A1* | 11/2007 | Tagawa ................ C10M 169/04 252/67 |
| 2007/0275865 A1* | 11/2007 | Tagawa .............. C10M 171/008 508/438 |
| 2008/0230738 A1 | 9/2008 | Minor et al. |
| 2009/0249809 A1 | 10/2009 | Minor et al. |
| 2009/0249864 A1 | 10/2009 | Minor et al. |
| 2009/0250650 A1 | 10/2009 | Minor et al. |
| 2009/0255285 A1 | 10/2009 | Minor et al. |
| 2009/0272931 A1 | 11/2009 | Minor et al. |
| 2009/0277194 A1 | 11/2009 | Minor et al. |
| 2009/0278072 A1 | 11/2009 | Minor et al. |
| 2010/0127208 A1 | 5/2010 | Nappa et al. |
| 2010/0132387 A1 | 6/2010 | Nappa et al. |
| 2010/0147016 A1* | 6/2010 | Kaneko .................. F04B 39/02 62/468 |
| 2011/0037017 A1 | 2/2011 | Leck |
| 2011/0204279 A1 | 8/2011 | Minor et al. |
| 2011/0251753 A1 | 10/2011 | Saito |
| 2012/0042668 A1 | 2/2012 | Nappa et al. |
| 2013/0207024 A1 | 8/2013 | Takigawa et al. |
| 2013/0213063 A1 | 8/2013 | Nappa et al. |
| 2014/0283537 A1 | 9/2014 | Minor et al. |
| 2015/0008358 A1 | 1/2015 | Okido et al. |
| 2015/0068227 A1 | 3/2015 | Nappa et al. |
| 2015/0083957 A1 | 3/2015 | Minor et al. |
| 2015/0135745 A1 | 5/2015 | Nappa et al. |
| 2015/0300698 A1 | 10/2015 | Tanaka et al. |
| 2016/0032164 A1 | 2/2016 | Nappa et al. |
| 2016/0137898 A1 | 5/2016 | Minor et al. |
| 2017/0073559 A1 | 3/2017 | Minor et al. |
| 2017/0073560 A1 | 3/2017 | Nappa et al. |
| 2017/0198236 A1* | 7/2017 | Hiyoshi ............... C10M 169/04 |
| 2017/0218292 A1 | 8/2017 | Konno |
| 2018/0305599 A1* | 10/2018 | Sawada ................ C10M 169/04 |
| 2020/0040242 A1* | 2/2020 | Fukushima .......... C10M 105/48 |

FOREIGN PATENT DOCUMENTS

| | | |
|---|---|---|
| JP | 2007-204568 A | 8/2007 |
| JP | 4-275397 B2 | 6/2009 |
| JP | 2014-224271 A | 12/2014 |
| WO | WO-2006/094303 A2 | 9/2006 |
| WO | WO-2012/026303 A1 | 3/2012 |
| WO | WO-2013/062058 A1 | 5/2013 |
| WO | WO-2015/178233 A1 | 11/2015 |

* cited by examiner

REFRIGERATING MACHINE OIL COMPOSITION AND WORKING FLUID COMPOSITION FOR REFRIGERATING MACHINE USING SAME

TECHNICAL FIELD

The present invention relates to a refrigerating machine oil composition for a mixed refrigerant comprising difluoromethane.

BACKGROUND ART

In recent years, saturated hydrofluorocarbons (HFCs) and unsaturated hydrofluorocarbons (HFOs) which have zero ozone depletion potential and lower global warming potential (GWP) have been used as refrigerants for refrigerating machines. Among them, difluoromethane, 1,3,3,3-tetrafluoropropene, 2,3,3,3-tetrafluoropropene, and the like have low GWPs and thus are refrigerants preferred from the viewpoint of environmental problems. International Publication No. WO2006/094303 discloses use of a mixture of the aforementioned refrigerants. In addition, as refrigerating machine oils for the above refrigerants, International Publication Nos. WO2012/026303 and WO2013/062058 disclose ester-based refrigerating machine oils.

On the other hand, Japanese Patent Application Publication No. 2014-224271 teaches the following points of difluoromethane. Specifically, difluoromethane is less stable than other fluorine-based refrigerants, so that it easily degrades when exposed to a high-temperature environment or mixed with air and water, and generates a large amount of acids such as hydrofluoric acid when degraded. In addition, there are risks that the acids generated by the degradation of the refrigerant may deteriorate the refrigerating machine oil used in the refrigerating machine, and corrode parts such as an expansion valve. Further, in the compressor of the refrigerating machine, difluoromethane is used under higher pressure than the other fluorine-based refrigerants. Accordingly, a large load tends to be applied to sliding portions of the compressor that compresses difluoromethane and the refrigerating machine oil forms a thin film between the surfaces of the sliding parts, with the result that wear and seizure easily occur. In addition, International Publication No. WO2006/094303 mentioned above discloses, as a mixed refrigerant containing difluoromethane, a refrigerant containing a mixture of difluoromethane and an unsaturated hydrofluorocarbon as a main component, but states that the unsaturated hydrofluorocarbon is inferior in thermal and chemical stabilities because it has an unstable double bond in molecules. For this reason, a refrigerating machine oil used together with a mixed refrigerant containing difluoromethane is required to have excellent stability and excellent lubricity.

Meanwhile, as a material for improving the lubricity, U.S. Pat. No. 5,017,300 discloses refrigerating machine oil compositions containing a polyacrylic ester for a HFC refrigerant selected from 1,1,1,2-tetrafluoroethane (R134a), 1,1,2,2-tetrafluoroethane (R134), and pentafluoroethane (R125). Japanese Patent Application Publication No. H04-275397 discloses refrigerating machine oil compositions containing a polyacrylic ester for an R134a refrigerant. However, the aforementioned literatures neither describe a composition containing a polyacrylic ester and an ester of a polyhydric alcohol with an aliphatic monocarboxylic acid, nor describe use of the compositions as one for a mixed refrigerant comprising difluoromethane. Japanese Patent Application Publication No. 2007-204568 discloses refrigerating machine oil compositions for a carbon dioxide refrigerant containing a base oil and an oil-soluble polymer. However, the foregoing literature does not describe use of the aforementioned refrigerating machine oil compositions as one for a mixed refrigerant containing difluoromethane. In addition, Japanese Patent No. 3051673 discloses refrigerating machine oil compositions a Michael addition product of an acrylic ester and a malonic acid ester, and an ester oil.

SUMMARY OF INVENTION

The present invention has been made in view of the foregoing problems of the related art, and has an object to provide a refrigerating machine oil composition capable of achieving, when used in combination with a mixed refrigerant comprising difluoromethane, high levels of miscibility with the refrigerant, lubricity, and stability.

The present invention provides refrigerating machine oil compositions and a working fluid composition for a refrigerating machine according to the following [1] to [11].

[1]

A refrigerating machine oil composition for a mixed refrigerant comprising difluoromethane, the refrigerating machine oil composition comprising:

a polymer (A) below, and an ester (B) of polyhydric alcohol(s) with aliphatic monocarboxylic acid(s), wherein the polymer (A) is a polymer which is obtained by polymerizing monomer(s) consisting of at least one monomer of monosubstituted ethylenes and disubstituted ethylenes, and in which a ratio of a monomer represented by the following general formula (I):

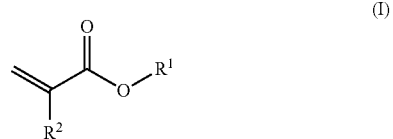

wherein $R^1$ represents an alkyl group having 1 to 14 carbon atoms, $R^2$ represents hydrogen or an alkyl group having 1 to 4 carbon atoms, and the sum of carbon numbers in $R^1$ and $R^2$ is 2 to 14, is 75 to 100% by mass based on a total mass of monomers constituting the polymer.

[2]

The refrigerating machine oil composition according to [1], wherein the mixed refrigerant comprising difluoromethane is a mixed refrigerant selected from the group consisting of: a mixed refrigerant of difluoromethane and a saturated hydrofluorocarbon other than difluoromethane; a mixed refrigerant of difluoromethane and an unsaturated hydrofluorocarbon; and a mixed refrigerant of difluoromethane, a saturated hydrofluorocarbon other than difluoromethane, and an unsaturated hydrofluorocarbon.

[3]

The refrigerating machine oil composition according to [1] or [2], wherein the mixed refrigerant comprising difluoromethane is a mixed refrigerant of difluoromethane and an unsaturated hydrofluorocarbon.

[4]

The refrigerating machine oil composition according to any one of [1] to [3], wherein the mixed refrigerant comprising difluoromethane is a mixed refrigerant selected from the group consisting of a mixed refrigerant of difluoromethane and 1,3,3,3-tetrafluoropropene, and a mixed refrigerant of difluoromethane and 2,3,3,3-tetrafluoropropene.

[5]

The refrigerating machine oil composition according to any one of [1] to [4], wherein $R^1$ is an alkyl group having 1 to 8 carbon atoms, $R^2$ is hydrogen or a methyl group, and the sum of carbon numbers in $R^1$ and $R^2$ is 2 to 9.

[6]

The refrigerating machine oil composition according to any one of [1] to [5], wherein $R^1$ is an alkyl group having 1 to 4 carbon atoms, $R^2$ is hydrogen or a methyl group, and the sum of carbon numbers in $R^1$ and $R^2$ is 2 to 5.

[7]

The refrigerating machine oil composition according to any one of [1] to [6], wherein, in the polymer (A), the ratio of a monomer represented by the general formula (I) is 100% by mass based on the total mass of monomers constituting the polymer.

[8]

The refrigerating machine oil composition according to any one of [1] to [7], wherein the ester (B) is an ester of at least one of pentaerythritol and dipentaerythritol with aliphatic monocarboxylic acid(s) having 4 to 9 carbon atoms.

[9]

The refrigerating machine oil composition according to any one of [1] to [8], wherein a mass ratio between the polymer (A) and the ester (B) is 3/97 to 45/55 (the polymer (A)/the ester (B)).

[10]

The refrigerating machine oil composition according to any one of [1] to [9], wherein a weight average molecular weight of the polymer (A) is 500 to 11000.

[11]

A working fluid composition for a refrigerating machine, comprising the refrigerating machine oil composition according to any one of [1] to [10] and a mixed refrigerant comprising difluoromethane.

DESCRIPTION OF EMBODIMENTS

Hereinafter, preferred embodiments of the present invention will be described in details.

<Polymer A>

A polymer (A) constituting a refrigerating machine oil composition of the present invention (hereinafter simply referred to as "polymer (A)") is a polymer obtained by polymerizing monomer(s) consisting of at least one monomer of monosubstituted ethylenes and disubstituted ethylenes, and the polymer can be produced by polymerizing 75 to 100% by mass of a monomer represented by the formula (I) and 0 to 25% by mass of at least one of monosubstituted ethylenes and disubstituted ethylenes other than the monomer represented by the formula (I) based on the total mass of monomers constituting the polymer.

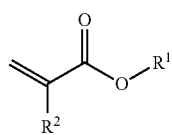

(I)

The above monosubstituted ethylene means a compound represented by a formula (II) and having one substituent on a carbon atom in an ethylene molecule, and the above disubstituted ethylene means a compound represented by a formula (III) or a formula (IV) and having two substituents on carbon atom(s) in an ethylene molecule.

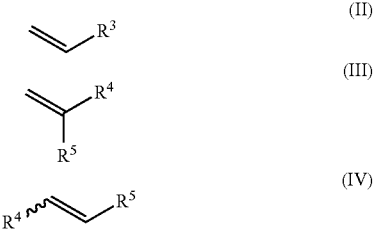

In the formula (I), $R^1$ represents an alkyl group having 1 to 14 carbon atoms, preferably represents an alkyl group having 1 to 8 carbon atoms, and specifically represents a methyl group, an ethyl group, a propyl group having a linear or branched structure, a butyl group having a linear or branched structure, a pentyl group having a linear or branched structure, a hexyl group having a linear or branched structure, a heptyl group having a linear or branched structure, an octyl group having a linear or branched structure, a nonyl group having a linear or branched structure, a decyl group having a linear or branched structure, an undecyl group having a linear or branched structure, a dodecyl group having a linear or branched structure, a tridecyl group having a linear or branched structure, and a tetradecyl group having a linear or branched structure. From the viewpoints of availability and miscibility with the mixed refrigerant comprising difluoromethane, $R^1$ is preferably a methyl group, an ethyl group, a butyl group having a linear or branched structure, or an octyl group having a linear or branched structure, and is more preferably a methyl group, an ethyl group, or a butyl group having a linear or branched structure. $R^2$ is hydrogen, a methyl group, an ethyl group, a propyl group having a linear or branched structure, or a butyl group having a linear or branched structure. From the viewpoints of availability and miscibility with the mixed refrigerant comprising difluoromethane, $R^2$ is preferably hydrogen or a methyl group. Here, when a monomer in which the sum of carbon numbers in $R^1$ and $R^2$ is 1 is contained at a ratio of 25 to 100% by mass based on the total mass of monomers constituting the polymer, the polymer (A) has poor solubility in an ester (B) of polyhydric alcohol(s) with aliphatic monocarboxylic acid(s) (hereinafter simply referred to as "ester (B)"). Meanwhile, when monomer(s) in which the sum of carbon numbers in $R^1$ and $R^2$ is 15 or more is/are contained at a ratio of 25 to 100% by mass based on the total mass of monomers constituting the polymer, a refrigerating machine oil composition comprising the polymer (A) and the ester (B) has poor miscibility with difluoromethane. For these reasons, from the viewpoints of the solubility of the polymer (A) in the ester (B) and the miscibility of the refrigerating machine oil composition comprising the polymer (A) and the ester (B) with the mixed refrigerant comprising difluoromethane, the monomer represented by the formula (I) in the polymer (A) is contained at a ratio preferably of 75 to 100% by mass, and more preferably of 80 to 100% by mass based on the total mass of the monomers constituting the polymer, and most preferably the monomer constituting the polymer (A) is only the monomer represented by the formula (I).

In the formulae (II), (III), and (IV), each of $R^3$, $R^4$, and $R^5$ represents an alkyl group having 1 to 18 carbon atoms and optionally having a substituent, an alkenyl group having 2 to 18 carbon atoms and optionally having a substituent, an aralkyl group having 7 to 18 carbon atoms and optionally having a substituent, an aryl group having 6 to 18 carbon atoms and optionally having a substituent, an alkoxyl group having 1 to 18 carbon atoms and optionally having a substituent, a (C1-18 alkyl)oxycarbonyl group optionally having a substituent, a (C6-18 aryl)oxycarbonyl group optionally having a substituent, a (C1-18 alkyl)carbonyloxy group optionally having a substituent, a (C6-18 aryl)oxycarbonyl group optionally having a substituent, an aminocarbonyl group, a (C1-18 alkyl)aminocarbonyl group optionally having a substituent, a (C6-18 aryl)aminocarbonyl group optionally having a substituent, a (C1-18 alkyl)carbonylamino group optionally having a substituent, a (C6-18 aryl)carbonylamino group optionally having a substituent, a (C1-18 alkoxy)methyl group optionally having a substituent, an acyl group having 1 to 18 carbon atoms and optionally having a substituent, a cyano group, or the like. Then, as the substituent, there are an amino group, a hydroxyl group, an acryloyloxy group, an epoxy group, an aryl group having 6 to 18 carbon atoms, and the like.

The following monomers may be used as the monosubstituted ethylene or disubstituted ethylene other than the monomer represented by the formula (I). Examples thereof include acrylic esters such as methyl acrylate, stearyl acrylate, 2-hydroxyethyl acrylate, 2-hydroxypropyl acrylate, 2-hydroxy-1-methylethyl acrylate, 4-hydroxybutyl acrylate, glycidyl acrylate, 2-aminoethyl acrylate, 3-aminopropyl acrylate, 4-aminobutyl acrylate, 2-(N-methylamino)ethyl acrylate, 2-(N,N-dimethylamino)ethyl acrylate, and pentaerythritol tetraacrylate; methacrylic esters such as 2-hydroxyethyl methacrylate, 2-hydroxypropyl methacrylate, 2-hydroxy-1-methylethyl methacrylate, 4-hydroxybutyl methacrylate, and glycidyl methacrylate; oxygen atom-containing monomers such as vinyl acetate, vinyl propionate, vinyl octanoate, methyl vinyl ether, ethyl vinyl ether, butyl vinyl ether, isobutyl vinyl ether, 2-ethylhexyl vinyl ether, maleic anhydride, diethyl maleate, diethyl fumarate, and ethylene glycol monoallyl ether; nitrogen atom-containing monomers such as allylamine, acrylamide, N,N-dimethylacrylamide, N—(N',N'-dimethylamino) methylacrylamide, N,N-diphenylacrylamide, methacrylamide, N,N-dimethylaminostyrene, and N-vinyl pyrrolidone; aromatic compounds such as styrene, vinyl toluene, 2,4-dimethylstyrene, 4-ethylstyrene, 2-vinylnaphthalene, and α-methylstyrene; and the like. Among them, 2-hydroxyethyl acrylate, glycidyl methacrylate, and N,N-dimethylacrylamide are preferable for use. Since the polymer (A) has poor solubility in the ester (B) when the monosubstituted ethylene and the disubstituted ethylene which constitute the polymer (A) other than the monomer represented by the formula (I) are contained therein at a too high ratio, the monosubstituted ethylene and the disubstituted ethylene other than the monomer represented by the formula (I) are contained therein at a ratio preferably of less than 25% by mass based on the total mass of the monomers constituting the polymer, and most preferably are not contained therein at all.

The polymer (A) includes the following modes (i) to (iii):
(i) a polymer in which a single monomer is polymerized;
(ii) a copolymer in which monomers of two or more types are polymerized; and
(iii) a mixture of two or more polymers selected from the group consisting of the (i) and (ii).

The polymerization form of the copolymer in the mode (ii) is not particularly limited and may be any one of block copolymerization, random copolymerization, and block/random copolymerization.

The weight average molecular weight of the polymer (A) is preferably 500 to 11000 and more preferably 1500 to 11000 from the viewpoint of the solubility of the polymer (A) in the ester (B).

The weight average molecular weight and the number average molecular weight are measured by gel permeation chromatography (GPC) and are calculated as styrene equivalent values. The measurement method of GPC is as described in the section of Examples.

A method for producing the polymer (A) is not particularly limited, but may be any of conventionally known methods such as radical polymerization methods and anionic polymerization methods. Examples of the radical polymerization methods include emulsion polymerization, suspension polymerization, solution polymerization, and the like. Among them, solution polymerization using an organic solvent as a solvent is preferable.

A specific radical polymerization method by solution polymerization is, for example, a method including preparing a liquid mixture in which a monomer and 0.1 to 10% by mole of an initiator relative to the amount of the monomer are dissolved in a solvent; placing a fresh solvent in a reactor in advance, followed by preheating to 60 to 150° C.; and dropwise adding the liquid mixture into the reactor over 1 to 20 hours to cause a reaction.

Examples of the solvent usable for the radical polymerization method by solution polymerization include alcohol solvents such as methanol, ethanol, propanol, 2-propanol, and butanol; hydrocarbon solvents such as benzene, toluene, xylene, cumene, and hexane; ester solvents such as ethyl acetate, isopropyl acetate, butyl acetate, and isobutyl acetate; ketone solvents such as acetone, methyl ethyl ketone, methyl isobutyl ketone, and diisobutyl ketone; ether solvents such as methoxybutanol, ethoxybutanol, ethylene glycol monomethyl ether, ethylene glycol monobutyl ether, propylene glycol monobutyl ether, and dioxane; nitrile solvents such as acetonitrile and propionitrile; amide solvents such as N,N-dimethylacetamide and N,N-dimethylformamide; synthetic oils such as polyol esters and dibasic acid esters; and mixtures of them.

As the initiator usable for the radical polymerization method by solution polymerization, an existing radical initiator can be used, and examples of the existing radical initiator include azo initiators such as 2,2'-azobis(2-methylpropionitrile), 2,2'-azobis(2-amidinopropane) dihydrochloride, 2,2'-azobis(N,N-dimethylene isobutyl amidine) dihydrochloride, and 1,1'-azobis(cyclohexyl-1-carbonitrile); organic peroxides such as hydrogen peroxide, benzoyl peroxide, tert-butyl hydroperoxide, tert-amyl hydroperoxide, cumene hydroperoxide, methyl ethyl ketone peroxide, di-tert-butyl peroxide, di-tert-amyl peroxide, tert-butylperoxy-2-ethylhexanoate, tert-amyl peroxy-2-ethyl hexanoate, tert-butyl peroxypivalate, and perbenzoic acid; persulfates such as sodium persulfate, potassium persulfate, and ammonium persulfate; redox initiators such as hydrogen peroxide-$Fe^{2+}$; and the like.

In the radical polymerization method by solution polymerization, the molecular weight of the polymer (A) can be controlled, for example, by adjusting the reaction temperature, the ratio of the initiator to the monomer, the method of adding the initiator, the concentration of the monomer in the reaction solution, the method of adding the monomer, the type of the solvent, use of a chain transfer agent, and the like.

As the anionic polymerization method, for example, solution polymerization is used.

A specific anionic polymerization method by solution polymerization is, for example, a method including preparing a liquid mixture in which a monomer is dissolved in a solvent such that the mixture has a temperature of −20 to 50° C.; and thereafter adding 0.1 to 20% by mole of an initiator to the mixture, thereby allowing a reaction to proceed for 0.5 to 5 hours.

Examples of the solvent usable for the anionic polymerization method by solution polymerization include the solvents listed above as the examples of the solvent usable for the radical polymerization method.

Examples of the initiator usable for the anionic polymerization method by solution polymerization include alkali metal salts of alcohols such as sodium methoxide, sodium ethoxide, sodium propoxide, sodium butoxide, potassium methoxide, potassium ethoxide, potassium propoxide, potassium butoxide, lithium methoxide, lithium ethoxide, lithium propoxide, and lithium butoxide; alkaline earth metal salts of alcohols such as magnesium dimethoxide, magnesium diethoxide, magnesium dipropoxide, and magnesium dibutoxide; organolithium reagents such as methyl lithium, ethyl lithium, propyl lithium, and butyl lithium; Grignard reagents such as methyl magnesium bromide, ethyl magnesium bromide, propyl magnesium bromide, and butyl magnesium bromide; and the like.

In the anionic polymerization method by solution polymerization, the molecular weight of the polymer (A) can be controlled, for example, by adjusting the ratio of the initiator to the monomer, the method of adding the initiator, the type of the solvent, and the like.

<Ester (B) of Polyhydric Alcohol with Aliphatic Monocarboxylic Acid>

The ester constituting the refrigerating machine oil composition of the present invention is an ester of one or more aliphatic monocarboxylic acids selected from aliphatic monocarboxylic acids with a polyhydric alcohol. Here, as the polyhydric alcohol, there are pentaerythritol, dipentaerythritol, neopentyl glycol, 2-butyl-2-ethyl-1,3-propanediol, 3-hydroxy-2,2-dimethylpropyl-3-hydroxy-2,2-dimethylpropanoate, trimethylolethane, trimethylolpropane, ditrimethylolpropane, tripentaerythritol, bispentaerythritol monoformal, and the like.

The ester (B) may be an ester of one or more aliphatic monocarboxylic acids selected from the aliphatic monocarboxylic acids with at least one of pentaerythritol and dipentaerythritol, or alternatively the ester may contain an additional polyhydric alcohol ester other than that. The content of the additional polyhydric alcohol ester is preferably 30% by mass or less based on the total mass of the ester (B).

Examples of the additional polyhydric alcohol ester are an ester of one or more aliphatic monocarboxylic acids selected from the aliphatic monocarboxylic acids with neopentyl glycol, and the like.

As the aliphatic monocarboxylic acid(s) in the ester (B), aliphatic monocarboxylic acids having 4 to 9 carbon atoms are preferable, and examples thereof include; linear aliphatic monocarboxylic acids such as butyric acid, pentanoic acid, hexanoic acid, heptanoic acid, octanoic acid, and nonanoic acid; branched aliphatic monocarboxylic acids such as isobutyric acid, 2-methylbutyric acid, 3-methylbutyric acid, 2,2-dimethylpropanoic acid, 2-ethylbutyric acid, 2-methylpentanoic acid, 4-methylpentanoic acid, 2-methylhexanoic acid, 2-ethylpentanoic acid, 2-ethyl-2-methylbutyric acid, 2,2-dimethylpentanoic acid, 2-methylheptanoic acid, 2-ethylhexanoic acid, 3-ethylhexanoic acid, 2-ethyl-2-methylpentanoic acid, 2-ethyl-4-methylpentanoic acid, 3,5,5-trimethylhexanoic acid, and 2,2-dimethylheptanoic acid; and the like. Among them, in view of the availability, butyric acid, pentanoic acid, heptanoic acid, isobutyric acid, 2-methylbutyric acid, 3-methylbutyric acid, 2-ethylhexanoic acid and 3,5,5-trimethylhexanoic acid are preferable.

Specific examples of an ester of one or more aliphatic monocarboxylic acids selected from the foregoing aliphatic monocarboxylic acids having 4 to 9 carbon atoms with pentaerythritol (hereinafter referred to as "ester B-PE") include an ester of butyric acid with pentaerythritol, an ester of pentanoic acid with pentaerythritol, an ester of isobutyric acid with pentaerythritol, an ester of 2-methylbutyric acid with pentaerythritol, an ester of 3-methylbutyric acid with pentaerythritol, an ester of 2-ethylbutyric acid with pentaerythritol, an ester of 2-ethylhexanoic acid with pentaerythritol, an ester of 3,5,5-trimethylhexanoic acid with pentaerythritol, an ester of isobutyric acid and 3,5,5-trimethylhexanoic acid with pentaerythritol, an ester of isobutyric acid and 2-ethylhexanoic acid with pentaerythritol, an ester of pentanoic acid and 3,5,5-trimethylhexanoic acid with pentaerythritol, an ester of pentanoic acid, heptanoic acid and 3,5,5-trimethylhexanoic acid with pentaerythritol, an ester of pentanoic acid, 2-methylbutyric acid, 3-methylbutyric acid, and 3,5,5-trimethylhexanoic acid with pentaerythritol, an ester of 2-methylbutyric acid and 3,5,5-trimethylhexanoic acid with pentaerythritol, an ester of 2-methylbutyric acid and 2-ethylhexanoic acid with pentaerythritol, an ester of 2-ethylhexanoic acid and 3,5,5-trimethylhexanoic acid with pentaerythritol, mixtures of these esters, mixtures of two or more esters having the same constituent carboxylic acid(s) but being different only in the composition ratio thereof in any of the above-listed esters, and the like. Among them, a preferable ester is an ester of isobutyric acid and 3,5,5-trimethylhexanoic acid with pentaerythritol, an ester of pentanoic acid and 3,5,5-trimethylhexanoic acid with pentaerythritol, an ester of pentanoic acid, 2-methylbutyric acid, 3-methylbutyric acid, and 3,5,5-trimethylhexanoic acid with pentaerythritol, an ester of pentanoic acid, heptanoic acid, and 3,5,5-trimethylhexanoic acid with pentaerythritol, an ester of 2-ethylhexanoic acid and 3,5,5-trimethylhexanoic acid with pentaerythritol, a mixture of an ester of isobutyric acid and 3,5,5-trimethylhexanoic acid with pentaerythritol with an ester of 2-ethylhexanoic acid and 3,5,5-trimethylhexanoic acid with pentaerythritol, or a mixture of two or more esters having the same constituent carboxylic acid(s) but being different only in the composition ratio thereof in any of the above-listed esters.

Specific examples of an ester of one or more aliphatic monocarboxylic acids selected from the foregoing aliphatic monocarboxylic acids having 4 to 9 carbon atoms with dipentaerythritol (hereinafter referred to as, "ester B-DPE") include an ester of butyric acid with dipentaerythritol, an ester of pentanoic acid with dipentaerythritol, an ester of isobutyric acid with dipentaerythritol, an ester of 2-methylbutyric acid with dipentaerythritol, an ester of 3-methylbutyric acid with dipentaerythritol, an ester of 2-ethylbutyric acid with dipentaerythritol, an ester of 2-ethylhexanoic acid with dipentaerythritol, an ester of 3,5,5-trimethylhexanoic acid with dipentaerythritol, an ester of isobutyric acid and 3,5,5-trimethylhexanoic acid with dipentaerythritol, an ester of isobutyric acid and 2-ethylhexanoic acid with dipentaerythritol, an ester of pentanoic acid and 3,5,5-trimethylhexanoic acid with dipentaerythritol, an ester of pentanoic acid, heptanoic acid, and 3,5,5-trimethylhexanoic acid with dipentaerythritol, an ester of pentanoic acid, 2-methylbutyric acid, 3-methylbutyric acid, and 3,5,5-trimethylhexanoic acid with dipentaerythritol, an ester of 2-methylbutyric acid and 3,5,5-trimethylhexanoic acid with dipentaerythritol, an ester of 2-methylbutyric acid and 2-ethylhexanoic acid with dipentaerythritol, an ester of 2-ethylhexanoic acid and 3,5,5-trimethylhexanoic acid with dipentaerythritol, mixtures of these esters, mixtures of two or more esters having the same constituent carboxylic acid(s) but being different only in the composition ratio thereof in any of the above-listed esters. Among them, a preferable ester is an ester of isobutyric acid and 3,5,5-trimethylhexanoic acid with dipentaerythritol, an ester of pentanoic acid and 3,5,5-trimethylhexanoic acid with dipentaerythritol, an ester of pentanoic acid, 2-methylbutyric acid, 3-methylbutyric acid and 3,5,5-trimethylhexanoic acid with dipentaerythritol, an ester of pentanoic acid, heptanoic acid and 3,5,5-trimethylhexanoic acid with dipentaerythritol, an ester of 2-ethylhexanoic acid and 3,5,5-trimethylhexanoic acid with dipentaerythritol, or a mixture of two or more esters having the same constituent carboxylic acid(s) but being different only in the composition ratio thereof in any of the above-listed esters.

Specific examples of an ester of one or more aliphatic monocarboxylic acids selected from the foregoing aliphatic monocarboxylic acids having 4 to 9 carbon atoms with neopentyl glycol (hereinafter referred to as "ester B-NPG") include an ester of 2-ethylhexanoic acid with neopentyl glycol, an ester of 3,5,5-trimethylhexanoic acid with neopentyl glycol, an ester of isobutyric acid and 3,5,5-trimethylhexanoic acid with neopentyl glycol, an ester of isobutyric acid and 2-ethylhexanoic acid with neopentyl glycol, and the like. Among them, an ester of 2-ethylhexanoic acid with neopentyl glycol is preferable.

The ester (B) is preferably any of the preferable esters listed above in the ester B-PE, the preferable esters listed above in the ester B-DPE, mixtures of the preferable esters listed above in the ester B-PE with the preferable esters listed above in the ester B-DPE, and mixtures of the preferable esters listed above in the ester B-PE with the preferable esters listed above in the ester B-NPG.

The ester (B) is preferably a full ester in which all the hydroxyl groups in the polyhydric alcohol are esterified, but may contain, as an impurity, a partial ester in which part(s) of the hydroxyl groups is/are not esterified but remains as hydroxyl group(s).

The ester (B) can be produced by causing the aliphatic monocarboxylic acid(s) and the polyhydric alcohol to react with each other, for example, at 120 to 300° C. for 5 to 40 hours. It is preferable to cause the reaction while removing water generated by the reaction from the reaction mixture.

In the reaction, a molar quantity of the aliphatic monocarboxylic acid used is preferably 1.1 to 1.4 times the molar quantity of hydroxyl groups in the polyhydric alcohol. The reaction may use a catalyst, and examples thereof include mineral acid, organic acid, Lewis acid, organic metal, solid acid, and the like. Specific examples of the mineral acid include hydrochloric acid, hydrofluoric acid, sulfuric acid, phosphoric acid, nitric acid, and the like. Specific examples of the organic acid include p-toluenesulfonic acid, benzenesulfonic acid, butanesulfonic acid, propanesulfonic acid, ethanesulfonic acid, methanesulfonic acid, and the like. Specific examples of the Lewis acid include boron trifluoride, aluminum chloride, tin tetrachloride, titanium tetrachloride, and the like. Specific examples of the organic metal include tetrapropoxytitanium, tetrabutoxytitanium, tetrakis(2-ethylhexyloxy)titanium, and the like. Specific examples of the solid acid include, for example, cation exchange resins and the like. The reaction may use a solvent, and examples thereof include hydrocarbon solvents such as benzene, toluene, xylene, hexane, heptane, isohexane, isooctane, isononane, and decane, and the like.

After the reaction, the reaction product may be purified by a method usually used in the field of organic synthetic chemistry (such as washing with water and/or an alkaline aqueous solution, treatment with activated carbon, an adsorbent, or the like, various types of chromatography, or distillation).

In the case where the ester (B) is a mixture of the ester B-PE and the ester B-DPE, for example, the ester B-PE and the ester B-DPE may be prepared independently according to the above-mentioned reaction method except that raw materials are changed to corresponding ones, and then be mixed with each other to form the ester (B). Further, when the aliphatic monocarboxylic acid(s) constituting the ester B-PE and the aliphatic monocarboxylic acid(s) constituting the ester B-DPE are fully the same, all the raw materials for use to produce the ester B-PE and the ester B-DPE may be put together into a mixture, followed by one series of production procedures according to the above-mentioned reaction method to form the ester (B).

<Refrigerating Machine Oil Composition>

The refrigerating machine oil composition of the present invention is a refrigerating machine oil composition for a mixed refrigerant comprising difluoromethane, the composition containing the polymer (A) and the ester (B). From the viewpoint of the stability of the refrigerating machine oil composition, a content of the polymer (A) in the refrigerating machine oil composition is preferably such that a mass ratio between the polymer (A) and the ester (B) is 3/97 to 45/55 (the polymer (A)/the ester (B)).

In a working fluid composition for a refrigerating machine of the present invention, a mixing ratio between the aforementioned refrigerating machine oil composition and the mixed refrigerant comprising difluoromethane is not particularly limited, but the amount of the refrigerating machine oil composition mixed is 1 to 1000 parts by mass and preferably 2 to 800 parts by mass based on 100 parts by mass of the mixed refrigerant comprising difluoromethane.

As the mixed refrigerant comprising difluoromethane, a mixed refrigerant having a GWP of 700 or less is preferable, and a mixed refrigerant having a GWP of 500 or less is further preferable from the viewpoint of environmental problems.

As the refrigerant contained in the mixed refrigerant comprising difluoromethane and being other than difluoromethane, there are saturated hydrofluorocarbons such as R125, R134, R134a, 1,1,1-trifluoroethane (R143a), and 1,1-difluoroethane (R152a); unsaturated hydrofluorocarbons such as 1,3,3,3-tetrafluoropropene (HFO-1234ze) and 2,3,3,3-tetrafluoropropene (HFO-1234yf); and hydrocarbons such as propane. Among them, from the viewpoint of GWP, mixing any of R134a, R134, R125, HFO-1234ze, and HFO-1234yf is preferable, and mixing HFO-1234ze and HFO-1234yf is more preferable.

The refrigerating machine oil composition of the present invention has excellent miscibility with the mixed refrigerant comprising difluoromethane, excellent stability, and excellent lubricity in a well-balanced manner.

In general, the miscibility with the refrigerant is represented by a two-phase separation temperature. The two-phase separation temperature can be measured in accordance with the method defined in JIS K2211:2009. As for the miscibility on the lower temperature side, a too high two-phase separation temperature may result in problems such as a lubrication failure in the refrigerant compressor, because the refrigerating machine oil composition discharged from the refrigerant compressor may stagnate in the refrigerant circulation cycle due to the occurrence of phase separation between the refrigerant and the refrigerating machine oil composition. For this reason, the refrigerating machine oil composition is required to have an appropriate range of the two-phase separation temperature. The two-phase separation temperature on the low temperature side is preferably −10° C. or below, more preferably −20° C. or below, further preferably −30° C. or below, and most preferably −40° C. or below.

As the stability, there are, for example, thermal stability, oxidation stability, hydrolytic stability, shear stability, and the like. In the case where the mixed refrigerant comprising difluoromethane is a mixed refrigerant of difluoromethane and unsaturated hydrofluorocarbon(s), for example, the mixed refrigerant degrades and generates acids when exposed to a high-temperature environment or mixed with air and water, and therefore poses risks of deterioration of the refrigerating machine oil composition and corrosion of parts such as the expansion valve. Hence, the excellent stability is required, in particular, in the system in which air and water are mixed.

As the lubricity, there are friction-reducing property, wear-reducing property, anti-seizure property, and the like. Difluoromethane in the compressor of the refrigerating machine is used under higher pressure than the other fluorine-based refrigerants. For this reason, a large load tends to be applied to the sliding portions of the compressor that compresses difluoromethane and the refrigerating machine oil forms a thin film between surfaces of sliding members, with the result that wear or seizure may occur. Hence, the refrigerating machine oil composition for a mixed refrigerant comprising difluoromethane is also required to have excellent wear-reducing property and anti-seizure property.

A kinematic viscosity at 40° C. of the refrigerating machine oil composition of the present invention is preferably 20 to 1000 mm$^2$/s, more preferably 20 to 500 mm$^2$/s, and further preferably 25 to 250 mm$^2$/s. In the present invention, the kinematic viscosity means a kinematic viscosity measured in accordance with JIS K2283:2000.

An acid number of the refrigerating machine oil composition of the present invention is not particularly limited, but is preferably 0.5 mgKOH/g or less, more preferably 0.1 mgKOH/g or less, and further preferably 0.05 mgKOH/g or less. The refrigerating machine oil composition, if having a high acid number, may accelerate corrosion of metals used in the refrigerating machine and pipes and deterioration of the refrigerating machine oil composition of the present invention. For this reason, a low acid number is required. In the present invention, the acid number means an acid number measured in accordance with the method of JIS K2501:2003.

A pour point of the refrigerating machine oil composition of the present invention is not particularly limited, but is preferably −20° C. or below and more preferably −30° C. or below. In the present invention, the pour point means a pour point measured in accordance with the method of JIS K2269:1987.

A volume resistivity of the refrigerating machine oil composition of the present invention is not particularly limited, but is preferably $1.0 \times 10^{11}$ Ω·cm or higher, more preferably $1.0 \times 10^{12}$ Ω·cm or higher, and further preferably $1.0 \times 10^{13}$ Ω·cm or higher. In the present invention, the volume resistivity means a value at 30° C. measured in accordance with the method of JIS C2101:1999.

The polymer (A) and the ester (B) constituting the refrigerating machine oil composition of the present invention cannot produce the effects of the present invention if the polymer (A) and the ester (B) are separated from each other when used in a low temperature environment such as winter and cold climates. Therefore, it is preferable that the polymer (A) and the ester (B) be uniformly dissolved without separation even at around −20° C.

The refrigerating machine oil composition of the present invention may optionally contain a lubricating base oil other than the ester (B) and lubricating oil additives. In this case, however, the total mass of the polymer (A) and the ester (B) in the refrigerating machine oil composition is preferably in the range of 70 to 99% by mass and more preferably in the range of 95 to 99% by mass based on the total mass of the refrigerating machine oil composition.

Examples of the lubricating base oil other than the ester (B) include mineral oils, synthetic base oils, and the like. Examples of the mineral oils include paraffin-base crude oils, intermediate-base crude oils, and naphthenic-base crude oils. Refined oils obtained by refining these oils by distillation or the like can be also used. Examples of the synthetic base oils include poly-α-olefins (polybutene, polypropylene, α-olefin oligomers having 8 to 14 carbon atoms, and the like), aliphatic esters other than the ester (B) (fatty acid monoesters, aliphatic polybasic acid esters, and the like), aromatic esters (aromatic monoesters, aromatic polyhydric alcohol esters, aromatic polybasic acid esters, and the like), complex esters (esters of a polyhydric alcohol, a polybasic acid, and a monohydric alcohol, esters of a polyhydric alcohol, a polybasic acid, and a monobasic acid, and the like), polyalkylene glycols, polyvinyl ethers, polycarbonates, alkylbenzenes, and the like. Among them, the complex esters are preferable for use. Examples of the complex esters include a complex ester of neopentyl glycol, adipic acid, and 2-ethylhexanol, a complex ester of neopentyl glycol, adipic acid, and 3,5,5-trimethylhexanol, a complex ester of neopentyl glycol, 1,4-butanediol, adipic acid, and 3,5,5-trimethylhexanol, a complex ester of trimethylolpropane, adipic acid, and 2-ethylhexanol, and the like.

In the refrigerating machine oil composition of the present invention, a content of the lubricating base oil other than the ester (B) may be any content in a range in which the effects of the present invention are not impaired, but is preferably 30% by mass or less, more preferably 20% by mass or less, and most preferably 10% by mass or less based on the total mass of the refrigerating machine oil composition.

Examples of the lubricating oil additive include oxidation inhibitors, wear-reducing agents (anti-wear agents, anti-seizure agents, extreme pressure agents, and so on), friction modifiers, oiliness agents, acid scavengers, metal deactivators, rust preventative agents, anti-foaming agents, and the like. A content of each lubricating oil additive is preferably 0.001 to 5% by mass based on the total mass of the refrigerating machine oil composition.

Examples of the oxidation inhibitors include phenol-based oxidation inhibitors such as 2,6-di-tert-butyl-4-methylphenol (BHT), 2,6-di-tert-butyl-4-ethylphenol, and 4,4'-methylenebis(2,6-di-tert-butylphenol); amine-based oxidation inhibitors such as phenyl-α-naphthylamine and N,N'-diphenyl-p-phenylenediamine; and the like. Among them, BHT is preferable for use.

Examples of the wear-reducing agents include phosphorus extreme pressure agents such as phosphate esters, thiophosphate esters, acidic phosphate esters, phosphite esters, amine salts of acidic phosphate esters, and the like. Here, as the phosphate ester, tricresyl phosphate is preferable for use.

Examples of the acid scavengers include epoxy-based acid scavengers such as glycidyl ethers and glycidyl esters. Here, 2-ethylhexyl glycidyl ether is preferable for use as the glycidyl ether, whereas glycidyl neodecanoate is preferable for use as the glycidyl ester.

Examples of the metal deactivators include benzotriazole, 2,5-dialkylmercapto-1,3,4-thiadiazole, and the like, among which the benzotriazole is preferable for use.

Examples of the anti-foaming agents include dimethylsiloxane and the like.

EXAMPLES

Hereinafter, the present invention will be further described in more details using Production Examples, Examples, and Comparative Examples, but the present invention should not be limited to Examples described below.

Here, the weight average molecular weights of polymers in Production Examples 1 to 14 were measured by GPC (gel permeation chromatography) and calculated as styrene equivalent values.

[GPC]
<Conditions>

Instrument: Agilent 1200 Series LC system (manufactured by Agilent Technologies Japan, Ltd.)

Detector: Differential Refractometer

Column: TSK gel Super HM-L (manufactured by Tosoh Corporation), TSK gel Super HM-N (manufactured by Tosoh Corporation), and TSK gel Super H1000 (manufactured by Tosoh Corporation) were connected in series.

Column temperature: 40° C.

Flow rate: 0.6 mL/min

Solvent: Tetrahydrofuran (manufactured by Wako Pure Chemical Industries, Ltd.)

<Production of Polymer (A)>

Hereinafter, a method for producing the polymer (A) will be described. Tables 1 and 2 present a preparation content of monomer(s) constituting each polymer (% by mass), and the weight average molecular weight and the molecular weight distribution of the obtained polymer.

Production Example 1

[Production of Polymer (A)-1]

In a reactor equipped with a stirrer, a thermometer, and a Dimroth condenser, 300 mL of cumene (manufactured by Wako Pure Chemical Industries, Ltd.) was placed, and then was heated and stirred with circulation of nitrogen until the internal temperature reached 120° C. A liquid mixture of 300.0 g of ethyl acrylate (3.00 mol, manufactured by Wako Pure Chemical Industries, Ltd.), 15.0 g of tert-butyl peroxy-2-ethylhexanoate (0.07 mol, manufactured by ARKEMA Yoshitomi, Ltd.), and 600 mL of cumene was prepared in another container, and this liquid mixture was added dropwise to cumene in the reactor over 8 hours. After completion of the dropwise addition, the resultant liquid mixture was stirred at internal temperature of 120° C. for 1 hour, and then cumene and unreacted ethyl acrylate were distilled off with nitrogen bubbling at 120° C. for 5 hours under reduced pressure of 0.8 kPa to obtain 285.8 g of Polymer (A)-1.

Production Example 2

[Production of Polymer (A)-2]

295.2 g of Polymer (A)-2 was obtained by carrying out an operation similar to that in Production Example 1 except that 300 mL of xylene (manufactured by Wako Pure Chemical Industries, Ltd.) was used in place of cumene and the amount of tert-butyl peroxy-2-ethylhexanoate used was changed to 18.0 g (0.08 mol).

Production Example 3

[Production of Polymer (A)-3]

285.0 g of Polymer (A)-3 was obtained by carrying out an operation similar to that in Production Example 2 except that the amount of tert-butyl peroxy-2-ethylhexanoate used was changed to 9.0 g (0.04 mol).

Production Example 4

[Production of Polymer (A)-4]

83.8 g of Polymer (A)-4 was obtained by carrying out an operation similar to that in Production Example 1 except that the amount of cumene used was changed to 100 mL, 100.0 g of ethyl methacrylate (0.88 mol, manufactured by Wako Pure Chemical Industries, Ltd.) was used in place of ethyl acrylate, and the amount of tert-butyl peroxy-2-ethylhexanoate used was changed to 10.0 g (0.05 mol).

Production Example 5

[Production of Polymer (A)-5]

89.0 g of Polymer (A)-5 was obtained by carrying out an operation similar to that in Production Example 1 except that 100 mL of xylene was used in place of cumene, a mixture of 90.0 g of ethyl acrylate (0.90 mol) and 10.0 g of butyl acrylate (0.08 mol, manufactured by Wako Pure Chemical Industries, Ltd.) was used in place of ethyl acrylate, and the amount of tert-butyl peroxy-2-ethylhexanoate used was changed to 3.0 g (0.01 mol).

Production Example 6

[Production of Polymer (A)-6]

88.9 g of Polymer (A)-6 was obtained by carrying out an operation similar to that in Production Example 1 except that 100 mL of xylene was used in place of cumene, a mixture of 90.0 g of ethyl acrylate (0.90 mol) and 10.0 g of 2-ethylhexyl acrylate (0.05 mol, manufactured by Wako Pure Chemical Industries, Ltd.) was used in place of ethyl acrylate, 6.0 g of di-tert-amyl peroxide (0.03 mol, manufactured by ARKEMA Yoshitomi, Ltd.) was used in place of tert-butyl peroxy-2-ethylhexanoate, and the internal temperature in the reactor was changed to 140° C.

Production Example 7

[Production of Polymer (A)-7]

In a reactor equipped with a stirrer, a thermometer, and a Dimroth condenser, 500 mL of N,N-dimethylformamide (manufactured by Wako Pure Chemical Industries, Ltd.), 4.8 g of methanol (0.15 mol, manufactured by Wako Pure Chemical Industries, Ltd.) and 250.0 g of ethyl acrylate (2.50 mol) were placed, and then were stirred at 25° C. with circulation of nitrogen. Then, 9.7 g of a 28% methanol solution of sodium methoxide (0.05 mol, manufactured by Wako Pure Chemical Industries, Ltd.) was added to the above liquid mixture, followed by stirring for 1 hour. Thereafter, 1000 mL of toluene (manufactured by Wako Pure Chemical Industries, Ltd.) was added to the reactor, and the reaction solution was washed with 180 mL of 0.3 mol/L hydrochloric acid at 25° C. for 10 minutes. Next, the reaction solution was washed with 120 mL of a 0.1 mol/L sodium hydrogen carbonate aqueous solution at 25° C. for 10 minutes. Further, the reaction solution was washed three times with 100 mL of water at 25° C. for 10 minutes. Thereafter, the reaction solution was stirred with nitrogen bubbling at 100° C. for 2 hours under reduced pressure of 1.0 kPa to distill off the solvent and unreacted ethyl acrylate to obtain 175.9 g of Polymer (A)-7.

Production Example 8

[Production of Polymer (A)-8]

In a reactor equipped with a stirrer, a thermometer, and a Dimroth condenser, 130 mL of 2-propanol (manufactured by Wako Pure Chemical Industries, Ltd.) was placed, and then was heated and stirred with circulation of nitrogen until the internal temperature reached 83° C. Then, 250.0 g of ethyl acrylate (2.50 mol) and a liquid mixture of 17.5 g of tert-butyl peroxypivalate (0.10 mol, manufactured by ARKEMA Yoshitomi, Ltd.), and 35 g of toluene were prepared individually in separate containers, and ethyl acrylate and the liquid mixture were added dropwise to 2-propanol in the reactor over 3 hours. After completion of the dropwise addition, the resultant liquid mixture was stirred at internal temperature of 88° C. for 1 hour, and then 2-propanol and unreacted ethyl acrylate were distilled off with nitrogen bubbling at 120° C. for 2 hours under reduced pressure of 0.8 kPa to obtain 249.4 g of Polymer (A)-8.

Production Example 9

[Production of Polymer (A)-9]

244.6 g of Polymer (A)-9 was obtained by carrying out an operation similar to that in Production Example 8 except that a mixture of 225.0 g of ethyl acrylate (2.25 mol) and 25.0 g of isobutyl acrylate (0.20 mol) was used in place of ethyl acrylate, and the amount of tert-butyl peroxypivalate used was changed to 12.8 g (0.07 mol).

Production Example 10

[Production of Polymer (A)-10]

244.6 g of Polymer (A)-10 was obtained by carrying out an operation similar to that in Production Example 8 except that a mixture of 245.0 g of ethyl acrylate (2.45 mol) and 5.0 g of isobutyl methacrylate (0.04 mol, manufactured by Wako Pure Chemical Industries, Ltd.) was used in place of ethyl acrylate, and the amount of tert-butyl peroxypivalate used was changed to 14.3 g (0.08 mol).

Production Example 11

[Production of Polymer (A)-11]

251.2 g of Polymer (A)-11 was obtained by carrying out an operation similar to that in Production Example 8 except that a mixture of 225.0 g of ethyl acrylate (2.25 mol) and 25.0 g of isobutyl methacrylate (0.18 mol) was used in place of ethyl acrylate, and the amount of tert-butyl peroxypivalate used was changed to 16.9 g (0.10 mol).

Production Example 12

[Production of Polymer (A)-12]

In a reactor equipped with a stirrer, a thermometer, and a Dimroth condenser, 270 mL of 2-propanol was placed, and then was heated and stirred with circulation of nitrogen until the internal temperature reached 83° C. Then, a liquid mixture of 480.0 g of ethyl acrylate (4.79 mol) and 120.0 g of butyl acrylate (0.94 mol) and a liquid mixture of 10.0 g of tert-butyl peroxypivalate (0.06 mol) and 92 g of toluene were prepared individually in separate containers, and these liquid mixtures were added dropwise to 2-propanol in the reactor over 3 hours. After completion of the dropwise addition, the resultant liquid mixture was stirred at internal temperature of 87° C. for 1 hour, and then 2-propanol and unreacted monomers were distilled off with nitrogen bubbling at 130° C. for 3 hours under reduced pressure of 1.5 kPa to obtain 566.7 g of Polymer (A)-12.

Production Example 13

[Production of Polymer (A)-13]

228.5 g of Polymer (A)-13 was obtained by carrying out an operation similar to that in Production Example 8 except that a mixture of 215.0 g of ethyl acrylate (2.15 mol), 25.0 g of isobutyl acrylate (0.20 mol), and 10.0 g of pentaerythritol tetraacrylate (0.03 mol, manufactured by Tokyo Chemical Industry Co., Ltd.) was used in place of ethyl acrylate, and the amount of tert-butyl peroxypivalate used was changed to 17.4 g (0.10 mol).

Production Example 14

[Production of Polymer (A)-14]

245.5 g of Polymer (A)-14 was obtained by carrying out an operation similar to that in Production Example 8 except that a mixture of 212.5 g of ethyl acrylate (2.12 mol), 25.0 g of isobutyl acrylate (0.20 mol), and 12.5 g of ethylene glycol monoallyl ether (0.12 mol, manufactured by Tokyo Chemical Industry Co., Ltd.) was used in place of ethyl acrylate, and the amount of tert-butyl peroxypivalate used was changed to 16.5 g (0.09 mol).

TABLE 1

| Polymer | | (A)-1 | (A)-2 | (A)-3 | (A)-4 | (A)-5 | (A)-6 | (A)-7 |
|---|---|---|---|---|---|---|---|---|
| Preparation | EA | 100 | 100 | 100 | | 90 | 90 | 100 |
| Content | EMA | | | | 100 | | | |
| (% by mass) | BA | | | | | 10 | | |
| | IBA | | | | | | | |
| | IBMA | | | | | | | |
| | PETA | | | | | | | |
| | EGME | | | | | | | |
| | EHA | | | | | | | 10 |

TABLE 1-continued

| Polymer | (A)-1 | (A)-2 | (A)-3 | (A)-4 | (A)-5 | (A)-6 | (A)-7 |
|---|---|---|---|---|---|---|---|
| Weight Average Molecular Weight | 2670 | 3310 | 4440 | 3350 | 3900 | 2040 | 550 |
| Molecular Weight Distribution | | 2.61 | 1.92 | 2.09 | 1.91 | 2.06 | 1.97 | 1.36 |

EA: ethyl acrylate,
EMA: ethyl methacrylate,
BA: butyl acrylate
IBA: isobutyl acrylate,
IBMA: isobutyl methacrylate
PETA: pentaerythritol tetraacrylate
EGME: ethylene glycol monoallyl ether,
EHA: 2-ethylhexyl acrylate

TABLE 2

| Polymer | | (A)-8 | (A)-9 | (A)-10 | (A)-11 | (A)-12 | (A)-13 | (A)-14 |
|---|---|---|---|---|---|---|---|---|
| Preparation Content (% by mass) | EA | 100 | 90 | 98 | 90 | 80 | 86 | 85 |
| | EMA | | | | | | | |
| | BA | | | | | 20 | | |
| | IBA | | 10 | | | | 10 | 10 |
| | IBMA | | | 2 | 10 | | | |
| | PETA | | | | | | 4 | |
| | EGME | | | | | | | 5 |
| | EHA | | | | | | | |
| Weight Average Molecular Weight | | 3320 | 4160 | 3920 | 4240 | 5670 | 3620 | 3220 |
| Molecular Weight Distribution | | 2.06 | 2.06 | 2.01 | 2.05 | 2.06 | 2.14 | 1.94 |

EA: ethyl acrylate,
EMA: ethyl methacrylate,
BA: butyl acrylate
IBA: isobutyl acrylate,
IBMA: isobutyl methacrylate
PETA: pentaerythritol tetraacrylate
EGME: ethylene glycol monoallyl ether,
EHA: 2-ethylhexyl acrylate <Production of Ester (B)>

Hereinafter, a method for producing the ester (B) will be described.

The method used, as an adsorbent, KYOWAARD 500 manufactured by Kyowa Chemical Industry Co., Ltd.

The method also used, as an activated carbon, SHIRASAGI P manufactured by Japan EnviroChemicals, Limited.

Production Example 15

[Production of Pentaerythritol Ester in which a Molar Ratio Between Isobutyric Acid and 3,5,5-Trimethylhexanoic Acid is 62/38 (a Ratio of Isobutyric Acid/3,5,5-Trimethylhexanoic Acid) (Ester (B)-1)]

In a reactor equipped with a Dean Stark trap, 817 g of pentaerythritol (6.0 mol, manufactured by KOEI CHEMICAL COMPANY, LIMITED), 1586 g of isobutyric acid (18.0 mol, manufactured by Tokyo Chemical Industry Co., Ltd.) and 1709 g of 3,5,5-trimethylhexanoic acid (10.8 mol, manufactured by KH Neochem Corporation) were placed, and the mixture was degassed by nitrogen bubbling at 25° C. for 30 minutes while being stirred.

Subsequently, the mixture was stirred with nitrogen bubbling at 155 to 230° C. for 25 hours under normal pressure. After the reaction, the reaction product was stirred under reduced pressure of 1.3 kPa at 215 to 230° C. for 3 hours to distill off unreacted carboxylic acid in the reaction product. The reaction product was washed at 80° C. for 1 hour with 1 L of an alkaline aqueous solution containing sodium hydroxide in a molar amount twice the acid number of the reaction product. Then, the reaction product was washed three times at 70° C. for 1 hour with 1 L of water. Subsequently, the reaction product was dried by stirring with nitrogen bubbling at 70° C. for 1 hour under reduced pressure of 1.1 kPa. After 141 g (equivalent to 2% by mass of the reaction product) of an adsorbent and 141 g (equivalent to 2% by mass of the reaction product) of activated carbon were added to the reaction product, the reaction product was stirred with nitrogen bubbling under reduced pressure of 1.3 kPa at 110° C. for 2 hours, and then filtered using a filter aid to obtain 2800 g of Ester (B)-1.

Production Example 16

[Production of Pentaerythritol Ester in which a Molar Ratio Between Pentanoic Acid and 3,5,5-Trimethylhexanoic Acid is 78/22 (a Ratio of Pentanoic Acid/3,5,5-Trimethylhexanoic Acid) (Ester (B)-2)]

Ester (B)-2 was obtained by carrying out an operation similar to that in Production Example 15 except that a fatty acid mixture of pentanoic acid and 3,5,5-trimethylhexanoic acid was used in place of the fatty acid mixture of isobutyric acid and 3,5,5-trimethylhexanoic acid, and the molar ratio among amounts of pentaerythritol, pentanoic acid, and 3,5,5-trimethylhexanoic acid used (pentaerythritol/pentanoic acid/3,5,5-trimethylhexanoic acid) was set to 1/3.26/1.54.

Production Example 17

[Production of Pentaerythritol Ester in which a Molar Ratio Between 2-Ethylhexanoic Acid and 3,5,5-Trimethylhexanoic Acid is 48/52 (a Ratio of 2-Ethylhexanoic Acid/ 3,5,5-Trimethylhexanoic Acid) (Ester (B)-3)]

Ester (B)-3 was obtained by carrying out an operation similar to that in Production Example 15 except that a fatty acid mixture of 2-ethylhexanoic acid and 3,5,5-trimethylhexanoic acid was used in place of the fatty acid mixture of isobutyric acid and 3,5,5-trimethylhexanoic acid, and the molar ratio among amounts of pentaerythritol, 2-ethylhexanoic acid, and 3,5,5-trimethylhexanoic acid used was set to 1/2.44/2.36 (pentaerythritol/2-ethylhexanoic acid/3,5,5-trimethylhexanoic acid).

<Preparation and Evaluation of Refrigerating Machine Oil Compositions>

Using Polymers (A)-1 to (A)-14, Esters (B)-1 to (B)-3 obtained in Production Examples 1 to 17, and bis(2-ethylhexyl) adipate (manufactured by Tokyo Chemical Industry Co., Ltd., Ester (b)-1), refrigerating machine oil compositions 1 to 20 having constituents presented in Tables 3 to 6 were prepared, and the solubility test and the kinematic viscosity measurement for each of the compositions were conducted according to the following Test Examples 1 and 2. In addition, using Polymers (A)-1 to (A)-7 and Esters (B)-1 to (B)-3 obtained in Production Examples 1 to 7 and 15 to 17 in combination with BHT, refrigerating machine oil compositions 21 to 32 having constitutions presented in Tables 7 and 8 were prepared, and the solubility test for each of the compositions was conducted according to Test Example 1.

The refrigerating machine oil compositions 1 to 15 and 17 to 20 presented in Tables 3 to 6 used in combination with the refrigerant were evaluated according to Test Examples 3 and 4. The test results are presented in Tables 9 to 14. Further, the refrigerating machine oil compositions 21 to 32 presented in Tables 7 and 8 used in combination with the refrigerant were evaluated according to Test Example 5. The test results are presented in Tables 15 to 18.

[Test Example 1] Solubility Test

After each of the refrigerating machine oil compositions 1 to 16 and 21 to 32 was allowed to stand at −20° C. for 24 hours, whether the refrigerating machine oil composition was clouded or not was checked. The composition not clouded was marked with ○, whereas the clouded composition was marked with x. Tables 3 to 8 present the measurement results. Note that [Test Example 2] to [Test Example 5] were not conducted on the composition 16, because it had poor solubility.

[Test Example 2] Kinematic Viscosity Measurement

The kinematic viscosity at 40° C. of each of the refrigerating machine oil compositions 1 to 15 and 17 to 20 was measured according to the method in JIS K2283:2000 using a Cannon-Fenske viscometer. Tables 3 to 6 present the measurement results.

TABLE 3

|  |  | Example 1 Composition 1 | Example 2 Composition 2 | Example 3 Composition 3 | Example 4 Composition 4 | Example 5 Composition 5 |
|---|---|---|---|---|---|---|
| Mixing Ratio (% by mass) | (A)-1 | 12 | 22 |  |  |  |
|  | (A)-2 |  |  | 20 |  |  |
|  | (A)-3 |  |  |  | 30 |  |
|  | (A)-4 |  |  |  |  | 10 |
|  | (A)-5 |  |  |  |  |  |
|  | (A)-6 |  |  |  |  |  |
|  | (A)-7 |  |  |  |  |  |
|  | (A)-8 |  |  |  |  |  |
|  | (A)-9 |  |  |  |  |  |
|  | (A)-10 |  |  |  |  |  |
|  | (A)-11 |  |  |  |  |  |
|  | (A)-12 |  |  |  |  |  |
|  | (A)-13 |  |  |  |  |  |
|  | (A)-14 |  |  |  |  |  |
|  | (B)-1 | 88 |  |  | 70 |  |
|  | (B)-2 |  | 78 | 80 |  |  |
|  | (B)-3 |  |  |  |  | 90 |
|  | (b)-1 |  |  |  |  |  |
| Solubility |  | ○ | ○ | ○ | ○ | ○ |
| Kinematic Viscosity at 40° C. (mm$^2$/s) |  | 67.5 | 67.6 | 68.3 | 192.2 | 140.1 |

(b)-1: bis(2-ethylhexyl) adipate (manufactured by Tokyo Chemical Industry Co., Ltd.)

TABLE 4

|  |  | Example 6 Composition 6 | Example 7 Composition 7 | Example 8 Composition 8 | Example 9 Composition 9 | Example 10 Composition 10 |
|---|---|---|---|---|---|---|
| Mixing Ratio (% by mass) | (A)-1 |  |  |  |  |  |
|  | (A)-2 |  |  |  |  |  |
|  | (A)-3 |  |  |  |  |  |
|  | (A)-4 |  |  |  |  |  |

TABLE 4-continued

|  | | Example 6 Composition 6 | Example 7 Composition 7 | Example 8 Composition 8 | Example 9 Composition 9 | Example 10 Composition 10 |
|---|---|---|---|---|---|---|
| | (A)-5 | 10 | | | | |
| | (A)-6 | | 10 | | | |
| | (A)-7 | | | 70 | | |
| | (A)-8 | | | | 10 | |
| | (A)-9 | | | | | 10 |
| | (A)-10 | | | | | |
| | (A)-11 | | | | | |
| | (A)-12 | | | | | |
| | (A)-13 | | | | | |
| | (A)-14 | | | | | |
| | (B)-1 | 90 | 90 | 30 | 90 | 90 |
| | (B)-2 | | | | | |
| | (B)-3 | | | | | |
| | (b)-1 | | | | | |
| Solubility | | ○ | ○ | ○ | ○ | ○ |
| Kinematic Viscosity at 40° C. (mm$^2$/s) | | 67.2 | 60.9 | 42.7 | 69.0 | 69.0 |

(b)-1: bis(2-ethylhexyl) adipate (manufactured by Tokyo Chemical Industry Co., Ltd.)

TABLE 5

|  | | Example 11 Composition 11 | Example 12 Composition 12 | Example 13 Composition 13 | Example 14 Composition 14 | Example 15 Composition 15 |
|---|---|---|---|---|---|---|
| Mixing Ratio (% by mass) | (A)-1 | | | | | |
| | (A)-2 | | | | | |
| | (A)-3 | | | | | |
| | (A)-4 | | | | | |
| | (A)-5 | | | | | |
| | (A)-6 | | | | | |
| | (A)-7 | | | | | |
| | (A)-8 | | | | | |
| | (A)-9 | | | | | |
| | (A)-10 | 10 | | | | |
| | (A)-11 | | 10 | | | |
| | (A)-12 | | | 10 | | |
| | (A)-13 | | | | 10 | |
| | (A)-14 | | | | | 10 |
| | (B)-1 | 90 | 90 | 90 | 90 | 90 |
| | (B)-2 | | | | | |
| | (B)-3 | | | | | |
| | (b)-1 | | | | | |
| Solubility | | ○ | ○ | ○ | ○ | ○ |
| Kinematic Viscosity at 40° C. (mm$^2$/s) | | 71.2 | 72.4 | 76.0 | 70.1 | 70.5 |

(b)-1: bis(2-ethylhexyl) adipate (manufactured by Tokyo Chemical Industry Co., Ltd.)

TABLE 6

|  | | Reference Ex. 1 Composition 16 | Comp. Ex. 1 Composition 17 | Comp. Ex. 2 Composition 18 | Comp. Ex. 3 Composition 19 | Comp. Ex. 4 Composition 20 |
|---|---|---|---|---|---|---|
| Mixing Ratio (% by mass) | (A)-1 | | | | | |
| | (A)-2 | 10 | | | | |
| | (A)-3 | | | | | |
| | (A)-4 | | | | | |
| | (A)-5 | | | | | |
| | (A)-6 | | | | | |
| | (A)-7 | | 100 | | | |
| | (A)-8 | | | | | |
| | (A)-9 | | | | | |
| | (A)-10 | | | | | |
| | (A)-11 | | | | | |
| | (A)-12 | | | | | |

TABLE 6-continued

|  |  | Reference Ex. 1 Composition 16 | Comp. Ex. 1 Composition 17 | Comp. Ex. 2 Composition 18 | Comp. Ex. 3 Composition 19 | Comp. Ex. 4 Composition 20 |
| --- | --- | --- | --- | --- | --- | --- |
|  | (A)-13 |  |  |  |  |  |
|  | (A)-14 |  |  |  |  |  |
|  | (B)-1 |  | 100 |  |  |  |
|  | (B)-2 |  |  | 100 |  |  |
|  | (B)-3 |  |  |  |  | 100 |
|  | (b)-1 | 90 |  |  |  |  |
| Solubility |  | x | — | — | — | — |
| Kinematic Viscosity at 40° C. (mm²/s) |  | — | 40.8 | 45.4 | 32.0 | 69.5 |

(b)-1: bis(2-ethylhexyl) adipate (manufactured by Tokyo Chemical Industry Co., Ltd.)

TABLE 7

|  |  | Example 16 Composition 21 | Example 17 Composition 22 | Example 18 Composition 23 | Example 19 Composition 24 | Example 20 Composition 25 | Example 21 Composition 26 |
| --- | --- | --- | --- | --- | --- | --- | --- |
| Mixing Ratio (% by mass) | (A)-1 | 11.9 | 21.9 |  |  |  |  |
|  | (A)-2 |  |  | 19.9 |  |  |  |
|  | (A)-3 |  |  |  | 29.8 |  |  |
|  | (A)-4 |  |  |  |  | 9.9 |  |
|  | (A)-5 |  |  |  |  |  | 9.9 |
|  | (A)-6 |  |  |  |  |  |  |
|  | (A)-7 |  |  |  |  |  |  |
|  | (A)-8 |  |  |  |  |  |  |
|  | (A)-9 |  |  |  |  |  |  |
|  | (A)-10 |  |  |  |  |  |  |
|  | (A)-11 |  |  |  |  |  |  |
|  | (A)-12 |  |  |  |  |  |  |
|  | (A)-13 |  |  |  |  |  |  |
|  | (A)-14 |  |  |  |  |  |  |
|  | (B)-1 | 87.6 |  |  | 69.7 |  | 89.6 |
|  | (B)-2 |  | 77.6 | 79.6 |  |  |  |
|  | (B)-3 |  |  |  |  | 89.6 |  |
|  | BHT | 0.5 | 0.5 | 0.5 | 0.5 | 0.5 | 0.5 |
| Solubility |  | ○ | ○ | ○ | ○ | ○ | ○ |

40

TABLE 8

|  |  | Example 22 Composition 27 | Example 23 Composition 28 | Comp. Ex. 5 Composition 29 | Comp. Ex. 6 Composition 30 | Comp. Ex. 7 Composition 31 | Comp. Ex. 8 Composition 32 |
| --- | --- | --- | --- | --- | --- | --- | --- |
| Mixing Ratio (% by mass) | (A)-1 |  |  |  |  |  |  |
|  | (A)-2 |  |  |  |  |  |  |
|  | (A)-3 |  |  |  |  |  |  |
|  | (A)-4 |  |  |  |  |  |  |
|  | (A)-5 |  |  |  |  |  |  |
|  | (A)-6 | 9.9 |  |  |  |  |  |
|  | (A)-7 |  | 69.7 | 99.5 |  |  |  |
|  | (A)-8 |  |  |  |  |  |  |
|  | (A)-9 |  |  |  |  |  |  |
|  | (A)-10 |  |  |  |  |  |  |
|  | (A)-11 |  |  |  |  |  |  |
|  | (A)-12 |  |  |  |  |  |  |
|  | (A)-13 |  |  |  |  |  |  |
|  | (A)-14 |  |  |  |  |  |  |
|  | (B)-1 | 89.6 | 29.8 |  | 99.5 |  |  |
|  | (B)-2 |  |  |  |  | 99.5 |  |
|  | (B)-3 |  |  |  |  |  | 99.5 |
|  | BHT | 0.5 | 0.5 | 0.5 | 0.5 | 0.5 | 0.5 |
| Solubility |  | ○ | ○ | ○ | ○ | ○ | ○ |

[Test Example 3] Measurement of Two-Phase Separation Temperature (Evaluation of Miscibility with Refrigerant)

The two-phase separation temperature of each of the refrigerating machine oil compositions 1 to 15 and 17 to 20 was measured according to the method in JIS K2211:2009. A mixture of 0.3 g of each of the refrigerating machine oil compositions 1 to 15 and 17 to 20 and 2.7 g of the mixed refrigerant comprising difluoromethane were placed in a pressure-resistant glass tube, and then was cooled from 30° C. at a rate of temperature decrease of 0.5° C. per minute. Then, a temperature at which the mixture was separated into two phases, or became clouded was measured as the two-phase separation temperature. Tables 9 to 14 present the results.

[Test Example 4] Pin & Vee Block Test (Evaluation of Load Carrying Capacity)

The lubricity of each of the working fluid compositions for a refrigerating machine was evaluated by a load carrying capacity test according to ASTM D3233 TEST METHOD A. Using an air-tight pressure-type Pin-and-Vee Block tester (manufactured by FALEX Corporation) equipped with a pressure-resistant container for storing sliding portions therein, 80 g of each of the refrigerating machine oil compositions 1 to 15 and 17 to 20 was set in the pressure-resistant container, and the load carrying capacity test was conducted while introducing the mixed refrigerant comprising difluoromethane so that the temperature inside the pressure-resistant container was 60° C. and the absolute pressure was 600 kPa. The higher the value of the seizure load, the better the load carrying capacity. Tables 9 to 14 present the results.

TABLE 9

|  | Example 24 | Example 25 | Example 26 | Example 27 | Example 28 |
|---|---|---|---|---|---|
| Refrigerating Machine Oil Composition | Composition 1 | Composition 2 | Composition 4 | Composition 1 | Composition 3 |
| Refrigerant | Mixed Refrigerant 1 | Mixed Refrigerant 1 | Mixed Refrigerant 1 | Mixed Refrigerant 2 | Mixed Refrigerant 2 |
| Two-phase Separation Temperature (° C.) | <−80 | <−80 | <−80 | <−80 | −69 |
| Load Carrying Capacity: Seizure Load (lbf) | 875 | 901 | 934 | 834 | 927 |

Mixed Refrigerant 1: Mixed Refrigerant of R32 and R125 [R32/R125 = 50/50 (mass ratio)](R410A, manufactured by DAIKIN INDUSTRIES, LTD.)
Mixed Refrigerant 2: Mixed Refrigerant of R32 (manufactured by DAIKIN INDUSTRIES, LTD.) and HFO-1234yf (manufactured by Honeywell International Inc.) [R32/HFO-1234yf = 72.5/27.5 (mass ratio)]

TABLE 10

|  | Example 29 | Example 30 | Example 31 | Example 32 | Example 33 |
|---|---|---|---|---|---|
| Refrigerating Machine Oil Composition | Composition 4 | Composition 6 | Composition 9 | Composition 10 | Composition 11 |
| Refrigerant | Mixed Refrigerant 2 | Mixed Refrigerant 2 | Mixed Refrigerant 2 | Mixed Refrigerant 2 | Mixed Refrigerant 2 |
| Two-phase Separation Temperature (° C.) | <−80 | <−80 | −80 | −80 | −80 |
| Load Carrying Capacity: Seizure Load (lbf) | 860 | 832 | 859 | 863 | 853 |

Mixed Refrigerant 2: Mixed Refrigerant of R32 (manufactured by DAIKIN INDUSTRIES, LTD.) and HFO-1234yf (manufactured by Honeywell International Inc.) [R32/HFO-1234yf = 72.5/27.5 (mass ratio)]

TABLE 11

|  | Example 34 | Example 35 | Example 36 | Example 37 | Example 38 |
|---|---|---|---|---|---|
| Refrigerating Machine Oil Composition | Composition 12 | Composition 13 | Composition 14 | Composition 15 | Composition 4 |
| Refrigerant | Mixed Refrigerant 2 | Mixed Refrigerant 2 | Mixed Refrigerant 2 | Mixed Refrigerant 2 | Mixed Refrigerant 3 |
| Two-phase Separation Temperature (° C.) | <−80 | −80 | <−80 | <−80 | <−80 |
| Load Carrying Capacity: Seizure Load (lbf) | 851 | 863 | 861 | 921 | 884 |

Mixed Refrigerant 2: Mixed Refrigerant of R32 (manufactured by DAIKIN INDUSTRIES, LTD.) and HFO-1234yf (manufactured by Honeywell International Inc.) [R32/HFO-1234yf = 72.5/27.5 (mass ratio)]
Mixed Refrigerant 3: Mixed Refrigerant of R32 and HFO-1234ze (manufactured by Honeywell International Inc.) [R32/HFO-1234ze = 73/27 (mass ratio)]

TABLE 12

|  | Example 39 | Example 40 | Example 41 | Example 42 |
| --- | --- | --- | --- | --- |
| Refrigerating Machine Oil Composition | Composition 7 | Composition 5 | Composition 8 | Composition 6 |
| Refrigerant | Mixed Refrigerant 3 | Mixed Refrigerant 4 | Mixed Refrigerant 4 | Mixed Refrigerant 5 |
| Two-phase Separation Temperature (° C.) | −76 | −49 | <−80 | <−80 |
| Load Carrying Capacity: Seizure Load (lbf) | 845 | 899 | 912 | 872 |

Mixed Refrigerant 3: Mixed Refrigerant of R32 and HFO-1234ze (manufactured by Honeywell International Inc.) [R32/HFO-1234ze = 73/27 (mass ratio)]
Mixed Refrigerant 4: Mixed Refrigerant of R32 and HFO-1234ze [R32/HFO-1234ze = 50/50 (mass ratio)]
Mixed Refrigerant 5: Mixed Refrigerant of R32 and HFO-1234ze [R32/HFO-1234ze = 25/75 (mass ratio)]

TABLE 13

|  | Comp. Ex. 9 | Comp. Ex. 10 | Comp. Ex. 11 | Comp. Ex. 12 |
| --- | --- | --- | --- | --- |
| Refrigerating Machine Oil Composition | Composition 17 | Composition 18 | Composition 19 | Composition 18 |
| Refrigerant | Mixed Refrigerant 3 | Mixed Refrigerant 1 | Mixed Refrigerant 1 | Mixed Refrigerant 2 |
| Two-phase Separation Temperature (° C.) | <−80 | <−80 | −64 | −78 |
| Load Carrying Capacity: Seizure Load (lbf) | 907 | 702 | 824 | 692 |

Mixed Refrigerant 1: Mixed Refrigerant of R32 and R125 [R32/R125 = 50/50 (mass ratio)](R410A, manufactured by DAIKIN INDUSTRIES, LTD.)
Mixed Refrigerant 2: Mixed Refrigerant of R32 (manufactured by DAIKIN INDUSTRIES, LTD.) and HFO-1234yf (manufactured by Honeywell International Inc.) [R32/HFO-1234yf = 72.5/27.5 (mass ratio)]
Mixed Refrigerant 3: Mixed Refrigerant of R32 and HFO-1234ze (manufactured by Honeywell International Inc.) [R32/HFO-1234ze = 73/27 (mass ratio)]

TABLE 14

|  | Comp. Ex. 13 | Comp. Ex. 14 | Comp. Ex. 15 | Comp. Ex. 16 |
| --- | --- | --- | --- | --- |
| Refrigerating Machine Oil Composition | Composition 19 | Composition 18 | Composition 20 | Composition 18 |
| Refrigerant | Mixed Refrigerant 2 | Mixed Refrigerant 3 | Mixed Refrigerant 4 | Mixed Refrigerant 5 |
| Two-phase Separation Temperature (° C.) | −60 | −74 | −46 | <−80 |
| Load Carrying Capacity: Seizure Load (lbf) | 830 | 701 | 755 | 770 |

Mixed Refrigerant 2: Mixed Refrigerant of R32 (manufactured by DAIKIN INDUSTRIES, LTD.) and HFO-1234yf (manufactured by Honeywell International Inc.) [R32/HFO-1234yf = 72.5/27.5 (mass ratio)]
Mixed Refrigerant 3: Mixed Refrigerant of R32 and HFO-1234ze (manufactured by Honeywell International Inc.) [R32/HFO-1234ze = 73/27 (mass ratio)]
Mixed Refrigerant 4: Mixed Refrigerant of R32 and HFO-1234ze [R32/HFO-1234ze = 50/50 (mass ratio)]
Mixed Refrigerant 5: Mixed Refrigerant of R32 and HFO-1234ze [R32/HFO-1234ze = 25/75 (mass ratio)]

[Test Example 5] Autoclave Test (Evaluation of Stability)

The test was conducted according to the method of JIS K 2211:2009. Specifically, 30 g of each of the refrigerating machine oil compositions 21 to 32 prepared to have a water content of 50 ppm or less and catalysts (iron, copper, aluminum lines) were placed in a test tube. This test tube was placed in a stainless steel gas cylinder hermetically and 30 g of difluoromethane and 50 mL of air were introduced into the cylinder, the inside of which was thereafter heated to and held at 175° C. for 7 days. After that, the acid number of the refrigerating machine oil composition was measured. The lower the acid number, the better the stability. Tables 15 to 18 present the results.

TABLE 15

|  | Example 43 | Example 44 | Example 45 | Example 46 | Example 47 |
|---|---|---|---|---|---|
| Refrigerating Machine Oil Composition | Composition 21 | Composition 22 | Composition 24 | Composition 21 | Composition 23 |
| Refrigerant | Mixed Refrigerant 1 | Mixed Refrigerant 1 | Mixed Refrigerant 1 | Mixed Refrigerant 2 | Mixed Refrigerant 2 |
| Stability: Post-test Acid Number (mgKOH/g) | 0.27 | 0.41 | 0.33 | 0.58 | 0.67 |

Mixed Refrigerant 1: Mixed Refrigerant of R32 and R125 [R32/R125 = 50/50 (mass ratio)] (R410A, manufactured by DAIKIN INDUSTRIES, LTD.)
Mixed Refrigerant 2: Mixed Refrigerant of R32 (manufactured by DAIKIN INDUSTRIES, LTD.) and HFO-1234yf (manufactured by Honeywell International Inc.) [R32/HFO-1234yf = 72.5/27.5 (mass ratio)]

TABLE 16

|  | Example 48 | Example 49 | Example 50 | Example 51 | Example 52 |
|---|---|---|---|---|---|
| Refrigerating Machine Oil Composition | Composition 24 | Composition 26 | Composition 24 | Composition 27 | Composition 25 |
| Refrigerant | Mixed Refrigerant 2 | Mixed Refrigerant 2 | Mixed Refrigerant 3 | Mixed Refrigerant 3 | Mixed Refrigerant 4 |
| Stability: Post-test Acid Number (mgKOH/g) | 0.62 | 0.52 | 0.24 | 0.25 | 0.27 |

Mixed Refrigerant 2: Mixed Refrigerant of R32 (manufactured by DAIKIN INDUSTRIES, LTD.) and HFO-1234yf (manufactured by Honeywell International Inc.) [R32/HFO-1234yf = 72.5/27.5 (mass ratio)]
Mixed Refrigerant 3: Mixed Refrigerant of R32 and HFO-1234ze (manufactured by Honeywell International Inc.) [R32/HFO-1234ze = 73/27 (mass ratio)]
Mixed Refrigerant 4: Mixed Refrigerant of R32 and HFO-1234ze [R32/HFO-1234ze = 50/50 (mass ratio)]

TABLE 17

|  | Example 53 | Example 54 | Comp. Ex. 17 | Comp. Ex. 18 | Comp. Ex. 19 |
|---|---|---|---|---|---|
| Refrigerating Machine Oil Composition | Composition 28 | Composition 26 | Composition 29 | Composition 30 | Composition 31 |
| Refrigerant | Mixed Refrigerant 4 | Mixed Refrigerant 5 | Mixed Refrigerant 3 | Mixed Refrigerant 1 | Mixed Refrigerant 1 |
| Stability: Post-test Acid Number (mgKOH/g) | 0.31 | 0.23 | 0.98 | 0.48 | 0.60 |

Mixed Refrigerant 1: Mixed Refrigerant of R32 and R125 [R32/R125 = 50/50 (mass ratio)](R410A, manufactured by DAIKIN INDUSTRIES, LTD.)
Mixed Refrigerant 3: Mixed Refrigerant of R32 and HFO-1234ze (manufactured by Honeywell International Inc.) [R32/HFO-1234ze = 73/27 (mass ratio)]
Mixed Refrigerant 4: Mixed Refrigerant of R32 and HFO-1234ze [R32/HFO-1234ze = 50/50 (mass ratio)]
Mixed Refrigerant 5: Mixed Refrigerant of R32 and HFO-1234ze [R32/HFO-1234ze = 25/75 (mass ratio)]

TABLE 18

|  | Comp. Ex. 20 | Comp. Ex. 21 | Comp. Ex. 22 | Comp. Ex. 23 | Comp. Ex. 24 |
|---|---|---|---|---|---|
| Refrigerating Machine Oil Composition | Composition 30 | Composition 31 | Composition 30 | Composition 32 | Composition 30 |
| Refrigerant | Mixed Refrigerant 2 | Mixed Refrigerant 2 | Mixed Refrigerant 3 | Mixed Refrigerant 4 | Mixed Refrigerant 5 |
| Stability: Post-test Acid Number (mgKOH/g) | 0.66 | 1.25 | 0.32 | 0.37 | 0.51 |

Mixed Refrigerant 2: Mixed Refrigerant of R32 (manufactured by DAIKIN INDUSTRIES, LTD.) and HFO-1234yf (manufactured by Honeywell International Inc.) [R32/HFO-1234yf = 72.5/27.5 (mass ratio)]
Mixed Refrigerant 3: Mixed Refrigerant of R32 and HFO-1234ze (manufactured by Honeywell International Inc.) [R32/HFO-1234ze = 73/27 (mass ratio)]
Mixed Refrigerant 4: Mixed Refrigerant of R32 and HFO-1234ze [R32/HFO-1234ze = 50/50 (mass ratio)]
Mixed Refrigerant 5: Mixed Refrigerant of R32 and HFO-1234ze [R32/HFO-1234ze = 25/75 (mass ratio)]

Tables 9 to 14 demonstrate that the refrigerating machine oil compositions of the present invention are excellent in the miscibility with a mixed refrigerant comprising difluoromethane and the lubricity. In addition, Tables 15 to 18 demonstrate that the use of the polymer (A) and the ester (B) in combination enabled the refrigerating machine oil compositions 21 to 28 of the present invention to achieve superior stability in a mixed refrigerant comprising difluoromethane to the composition 29 using the polymer (A) alone and the compositions 30 to 32 each using the ester (B) alone. As discussed above, it can be seen that a refrigerating machine oil composition of the present invention has excellent miscibility with a mixed refrigerant comprising difluoromethane, excellent lubricity, and excellent stability in a well-balanced manner.

INDUSTRIAL APPLICABILITY

According to the present invention, a refrigerating machine oil composition for a mixed refrigerant comprising difluoromethane, which has excellent miscibility, lubricity and stability, can be provided.

The invention claimed is:

1. A refrigerating machine oil composition for a mixed refrigerant comprising difluoromethane, the composition comprising:
a polymer (A) below, and
an ester (B) of polyhydric alcohol(s) with aliphatic monocarboxylic acid(s), wherein
the polymer (A) is a polymer which is obtained by polymerizing monomer(s) consisting of at least one monomer of monosubstituted ethylenes and disubstituted ethylenes, and in which a ratio of a monomer represented by the following general formula (I):

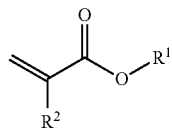

wherein $R^1$ represents an alkyl group having 1 to 14 carbon atoms, $R^2$ represents hydrogen or an alkyl group having 1 to 4 carbon atoms, and the sum of carbon numbers in $R^1$ and $R^2$ is 2 to 14, is 75 to 100% by mass based on a total mass of monomers constituting the polymer.

2. The refrigerating machine oil composition according to claim 1, wherein
the mixed refrigerant comprising difluoromethane is a mixed refrigerant selected from the group consisting of a mixed refrigerant of difluoromethane and a saturated hydrofluorocarbon other than difluoromethane; a mixed refrigerant of difluoromethane and an unsaturated hydrofluorocarbon; and a mixed refrigerant of difluoromethane, a saturated hydrofluorocarbon other than difluoromethane, and an unsaturated hydrofluorocarbon.

3. The refrigerating machine oil composition according to claim 1, wherein the mixed refrigerant comprising difluoromethane is a mixed refrigerant of difluoromethane and an unsaturated hydrofluorocarbon.

4. The refrigerating machine oil composition according to claim 1, wherein the mixed refrigerant comprising difluoromethane is a mixed refrigerant selected from the group consisting of a mixed refrigerant of difluoromethane and 1,3,3,3-tetrafluoropropene, and a mixed refrigerant of difluoromethane and 2,3,3,3-tetrafluoropropene.

5. The refrigerating machine oil composition according to claim 1, wherein $R^1$ is an alkyl group having 1 to 8 carbon atoms, $R^2$ is hydrogen or a methyl group, and the sum of carbon numbers in $R^1$ and $R^2$ is 2 to 9.

6. The refrigerating machine oil composition according to claim 1, wherein $R^1$ is an alkyl group having 1 to 4 carbon atoms, $R^2$ is hydrogen or a methyl group, and the sum of carbon numbers in $R^1$ and $R^2$ is 2 to 5.

7. The refrigerating machine oil composition according to claim 1, wherein, in the polymer (A), the ratio of a monomer represented by the general formula (I) is 100% by mass based on the total mass of monomers constituting the polymer.

8. The refrigerating machine oil composition according to claim 1, wherein the ester (B) is an ester of at least one of pentaerythritol and dipentaerythritol with aliphatic monocarboxylic acid(s) having 4 to 9 carbon atoms.

9. The refrigerating machine oil composition according to claim 1, wherein a mass ratio between the polymer (A) and the ester (B) is 3/97 to 45/55 (the polymer (A)/the ester (B)).

10. The refrigerating machine oil composition according to claim 1, wherein a weight average molecular weight of the polymer (A) is 500 to 11000.

11. A working fluid composition for a refrigerating machine, comprising the refrigerating machine oil composition according to claim 1 and a mixed refrigerant comprising difluoromethane.

* * * * *